(12) United States Patent
Kim et al.

(10) Patent No.: US 7,845,257 B2
(45) Date of Patent: Dec. 7, 2010

(54) ULTRA-PRECISION MACHINE TOOL

(75) Inventors: Chang-Ju Kim, West Sacramento, CA (US); Terence Padden, West Sacramento, CA (US); Jongsoo Kim, West Sacramento, CA (US)

(73) Assignee: Mori Seiki Co., Ltd., Yamato-Koriyama (JP)

( * ) Notice: Subject to any disclaimer, the term of this patent is extended or adjusted under 35 U.S.C. 154(b) by 303 days.

(21) Appl. No.: 12/204,507

(22) Filed: Sep. 4, 2008

(65) Prior Publication Data

US 2010/0050832 A1    Mar. 4, 2010

(51) Int. Cl.
*B23B 7/00* (2006.01)
*B23Q 1/54* (2006.01)

(52) U.S. Cl. ............... 82/118; 82/138; 82/132

(58) Field of Classification Search ............ 82/133, 82/132, 137, 138, 158, 904; 29/27 C; 409/183, 409/211, 216, 235
See application file for complete search history.

(56) References Cited

U.S. PATENT DOCUMENTS

| | | | | |
|---|---|---|---|---|
| 3,359,861 A | * | 12/1967 | Johnson et al. | 409/211 |
| 3,460,435 A | * | 8/1969 | Dahl et al. | 409/183 |
| 5,222,283 A | * | 6/1993 | Laschet | 29/27 C |
| 6,536,317 B2 | * | 3/2003 | Yamazaki et al. | 82/118 |
| 6,775,586 B2 | * | 8/2004 | Shibata et al. | 700/189 |
| 6,785,942 B2 | * | 9/2004 | Koike | 29/33 P |
| 6,870,286 B2 | | 3/2005 | Nakamoto et al. | |
| 7,168,351 B2 | * | 1/2007 | Hirayama et al. | 82/1.11 |

* cited by examiner

*Primary Examiner*—Will Fridie, Jr.
(74) *Attorney, Agent, or Firm*—Westerman, Hattori, Daniels & Adrian, LLP

(57) ABSTRACT

A five axis motion controlled ultra-precision machine tool is provided in which major portions are composed as a structure completely symmetric about the machining point and errors due to thermal displacement can be minimized. A pair of Y axis guide members (41,41) are secured to the top face of a base (i) at both sides of an X axis slider (3) interposed therebetween for X direction so as to movably guide Y axis sliders (4,4) in horizontal Y direction perpendicular to X axis. Y axis linear motors (42,42) and the Y axis guide members (41,41) are disposed substantially at the center of mass of the Y axis sliders (4,4) respectively, so that the Y axis sliders (4,4) can be driven in Y direction with vibration and errors in alignment minimized.

7 Claims, 2 Drawing Sheets

ULTRA-PRECISION MACHINE TOOL

FIELD OF THE INVENTION

This invention relates to an ultra-precision machine tool, specifically to a 5-axis motion control ultra-precision machine tool. More specifically, this invention relates to an ultra-precision machine tool for machining a workpiece which is made up of a structure of micrometer level or composed so as to have curved faces of micrometer level with a surface roughness of nanometer level.

BACKGROUND ART

Precision parts or devices, such as light guiding panels, micro-needle arrays, micro-fluid channels, micro prism retroreflectors, lens arrays, etc., are used in the fields of optics, biotechnology, electronics, mechatronics and so on.

These precision parts are composed of structures of micrometer level or composed so as to have curved faces of micrometer level, which are required to have a surface roughness of nanometer level. Most of these parts are fabricated by molding of plastics or glass, so that dies for mass production of these parts are needed.

Machining of such dies requires an ultra-precision machine tool which is controlled to align a tool or workpiece with an accuracy of nanometer level. In the ultra-precision machine tool described in U.S. Pat. No. 6,870,286, a table or a machining head is driven in a non-contact manner with linear motors and aerostatic bearings, while the position of the table or the machining head is detected by a non-contact type linear encoder. Further, a pair of linear motors are disposed at the positions symmetric about the center of the table or the machining head and the table or the machining head is driven at equidistant positions from the center of mass, thus machining accuracy of nanometer level is attained, However, the table or the machining head is disposed in an asymmetric manner about the machining point in the machine tool described in said USP, so that there is a fear that machining errors appear due to thermal displacement of the table or the machining head. Further, the length of the force loop between the tool and the workpiece is long because the machining head is supported on the column with an overhang, thus elastic deformation is accumulated in each portion and there appears errors of movement between the tool and the workpiece.

SUMMARY OF THE INVENTION

An object of this invention is to provide a 5-axis motion control ultra-precision machine tool in which major portions are composed as a structure completely symmetric about the machining point so as to minimize errors due to thermal displacement.

Another object of this invention is to provide a 5-axis motion control ultra-precision machine tool in which driving is performed for all the 5 axes at positions equidistant from the center of mass of the sliders so as to minimize errors in alignment or vibration.

Still another object of this invention is to provide a 5-axis motion control ultra-precision machine tool in which the length of the force loop between the tool and the workpiece is shortened so as to minimize the influence of elastic deformation of each portion.

Still another object of this invention is to provide a 5-axis motion control ultra-precision machine tool in which the motors acting also as heat sources are separated from cutting area and located at evenly distributed positions so as to make the thermal deformation to be uniform and minimize errors due to thermal displacement.

Still another object of the this invention is to provide a 5-axis motion control ultra-precision machine tool in which the base of the machine tool is supported by a vibration isolating structure so as to minimize the influence of vibration on the side of the earth.

In the first aspect of this invention, an ultra-precision machine tool is provided which is provided with:

a base (1), an X axis slider (3) provided movably in X direction horizontally on said base, a pair of X axis guide members (31,31) which are disposed at positions symmetric about the center of mass of said X axis slider so as to movably guide said X axis slider in X direction, a pair of X axis linear motors (32,32) which are disposed at positions symmetric about the center of mass of said X axis slider so as to drive said X axis slider in X direction, a table (33) which is rotatably supported on said X axis slider and on which is mounted a workpiece, a pair of Y axis sliders (4,4) which are disposed on said base on both sides of said X axis slider for X direction respectively so that said X axis slider is interposed therebetween and are provided movably in horizontal Y direction perpendicular to X direction, a pair of Y axis guide members (41,41) which are disposed on said base on both sides of said X axis slider for X direction respectively so as to movably guide said Y axis sliders in Y direction respectively, a pair of Y axis linear motors (42,42) which are disposed on said base on both sides of said X axis slider for X direction and at positions symmetric about the center of mass of the combination of said Y axis sliders so as to drive said Y axis sliders in Y direction, a pair of Z axis sliders (5,5) which are provided movably in Z direction perpendicular to X and Y directions on said pair of Y axis sliders respectively, two pairs of Z axis guide members (51,51) of which each pair of Z axis guide members are disposed at positions symmetric about the center of mass of each of said Z axis sliders on each of said Y axis sliders so as to movably guide said pair of Z axis sliders in Z direction respectively, two pairs of Z axis linear motors (52,52) of which each pair of Z axis linear motors are disposed at positions symmetric about the center of mass of each of said Z axis sliders on each of said Y axis sliders so as to drive said pair of Z axis sliders in Z direction, a spindle head supporting beam (6) in which both ends for X direction are rotatably supported on said Z axis sliders respectively so as to be capable of indexing rotationally about A axis parallel with X axis and a spindle head (61) which is secured to said spindle head supporting beam at the central position thereof and has a spindle for holding a tool.

In the second aspect of this invention, the ultra-precision machine tool in the first aspect is so arranged that said table is a C axis table rotatably supported so as to be capable of indexing rotationally about C axis parallel with Z axis.

In the third aspect of this invention, the ultra-precision machine tool in the first or second aspect is so arranged that said counter weights are secured to said spindle head supporting beam at respective ends thereof so as to compensate for the unbalance of mass of the spindle head supporting beam 6 and the spindle head about A axis.

In the fourth aspect of this invention, the ultra-precision machine tool in the first or second aspect is so arranged that in said X axis guide members, said Y axis guide members, said Z axis guide members, the rotationally supporting portions of said C axis table and the rotationally supporting portions of said spindle head supporting beam are composed of aerostatic bearings respectively.

In the fifth aspect of this invention, the ultra-precision machine tool in the first or second aspect is so arranged that said C axis table and said spindle head supporting beam are rotationally indexed by direct drive motors respectively.

In the sixth aspect of this invention, the ultra-precision machine tool in the first or second aspect further comprises:
an upper frame supporting said base,
a lower frame supporting said upper frame and disposed on the floor and
passive pneumatic vibration isolators interposed between said upper and lower frames and decreasing the vibration transferred from the floor to the base.

In the seventh aspect of this invention, the ultra-precision machine tool in the first or second aspect is so arranged that said base is formed of granite and the materials of said X axis guide members, said Y axis guide members and said Z axis guide members are alumina ceramic respectively.

Features and advantages of this invention will be explained in further details referring with accompanied drawings.

DETAILED DESCRIPTION OF THE PREFERRED EMBODIMENTS

Explanation will be made about preferred embodiments of this invention referring with accompanied drawings.

Figure 1:
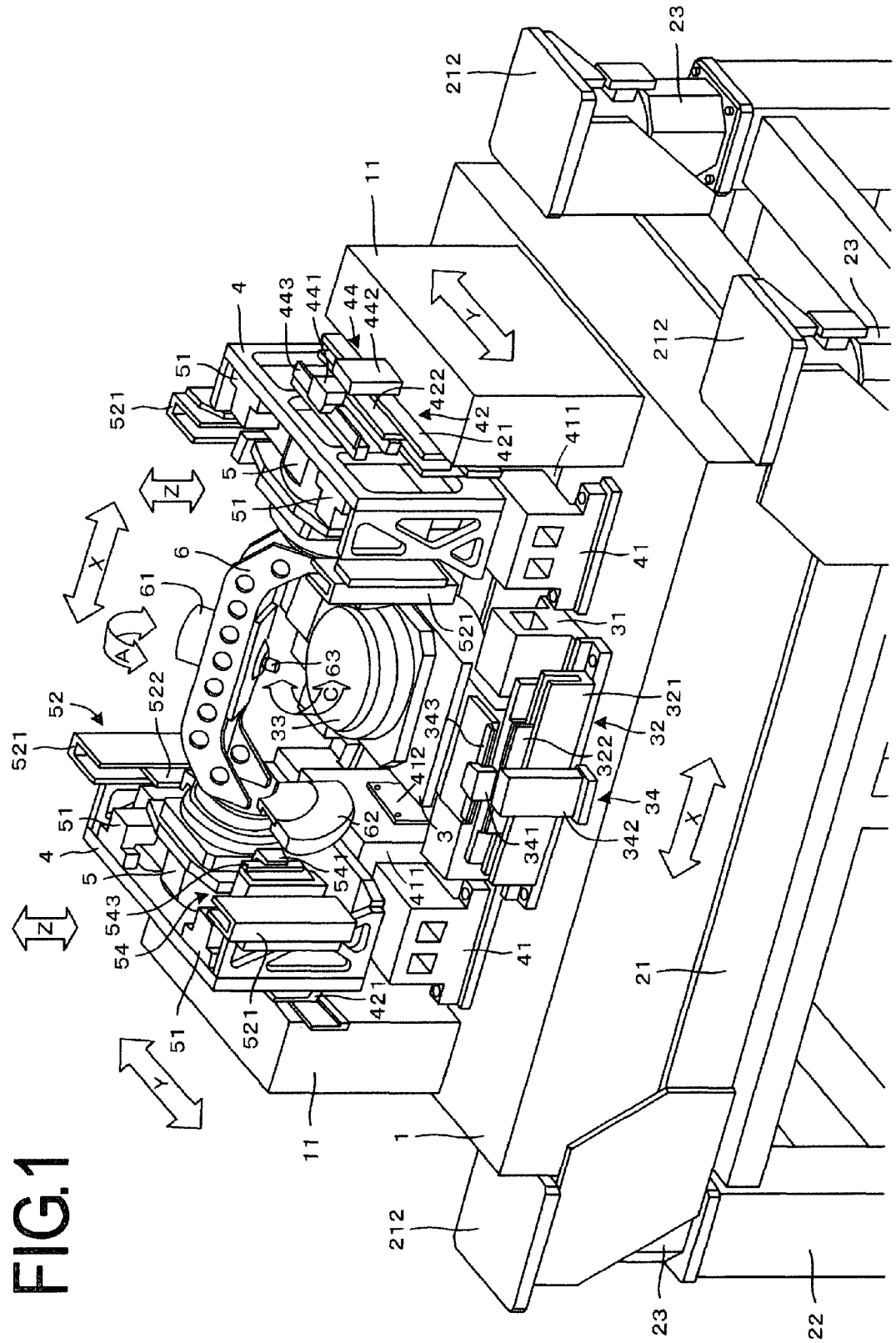
FIG. 1 is a perspective view showing an arrangement of the ultra-precision machine tool as a whole according to this invention.
Figure 2:
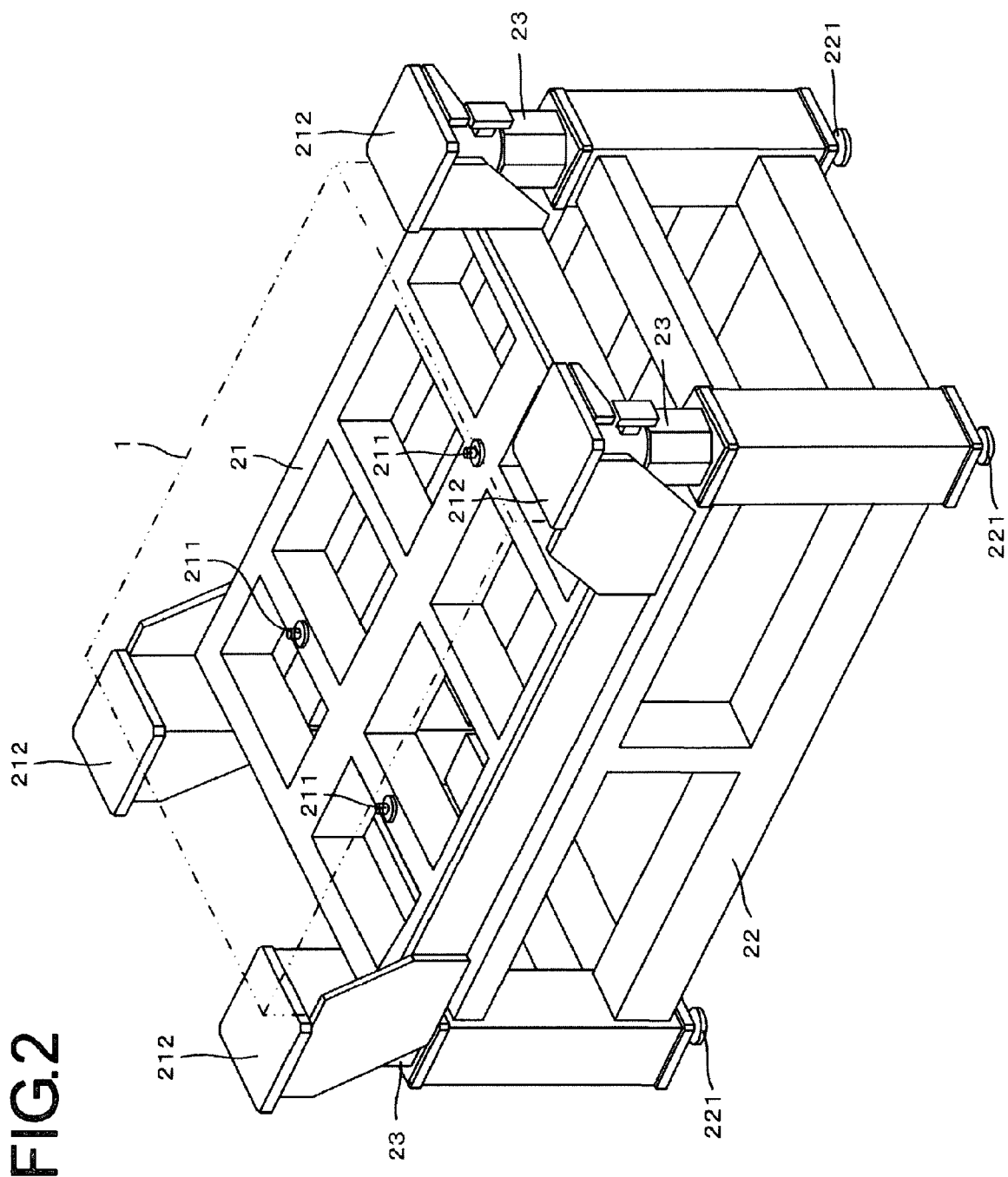
FIG. 2 is a perspective view showing the upper and lower frames supporting the base of the ultra-precision machine tool shown in FIG. 1.

The material of the rectangular base 1 supporting the ultra-precision machine tool arranged according to this invention, shown in FIGS. 1 and 2, is granite which has a low thermal expansion coefficient. As shown in detail in FIG. 2, the base 1 is placed on the upper frame 21 disposed on the lower frame 22 which is placed on the floor. The upper and lower frames 21 and 22 are formed by welding tube members (hollow pipes) with rectangular cross-sections. Four leveling devices 221 are disposed beneath the bottom face of the lower frame 22 at the four corners, thereby supporting the lower frame 22 on the floor at four positions. The leveling devices 221 are to adjust the altitude of the lower frame 22 and each of the leveling devices 221 is composed of a leveling seat and a leveling bolt.

Supporting rubber pads 211 are disposed at three positions between the upper frame 21 and the base 1, so as to prevent the base 1 from being distorted. Supporting brackets 212 are provided integrally with the upper frame 21 at the four corner thereof, protruding upwards from the top face of the upper frame 21.

Vibration isolators 23 are disposed between the bottom faces of the respective four supporting brackets 212 and the top face of the lower frame 22. Each of the vibration isolators 23 has a vibration sensor connected with a controller and a pneumatic actuator. Upon detecting vibration, the vibration sensors transfer output signals to the controller, which drives the pneumatic actuators with its drive signals so as to counterbalance and decrease the vibration transferred from the floor to the base 1.

As shown in detail in FIG. 1, an X axis slider 3 is placed movably in X direction on the top horizontal face of the base 1. The X axis slider 3 has a rectangular form elongated in horizontal Y direction perpendicular to X axis. A pair of X axis guide members 31,31, secured to the base 1 on its top face, are disposed at positions symmetric in Y direction about the center of mass of the X axis slider 3 so as to guide the X axis slider 3 movably in X direction.

Only the fore side one of a pair of X axis guide members 31,31 is seen in FIG. 1 and the other is not seen here. The X axis guide members 31,31 are made of alumina ceramic with a rectangular cross section, as shown. The X axis guide members 31,31 are secured to the top face of the base 1 such that only parts of the bottom face of each X axis guide member 31 abut with the top face of the base 1 so as to form X axis guide faces on the four lateral sides of each rectangular X axis guide member 31. Alumina ceramic has a low thermal expansion coefficient, so that errors due to thermal displacement of the X axis guide members can be minimized.

Pressurized air with adjusted pressure is supplied into the bearing clearances between the X axis slider 3 and the X axis guide faces so as to compose aerostatic bearings. A pair of X axis linear motors 32,32 for driving the X axis slider 3 in X direction are provided at positions symmetric about the center of mass of the X axis slider 3 and outside the X axis guide members 31 for Y direction. The stator 321 of each X axis linear motor 32 with U-shaped cross section is secured to the top face of the base 1 in parallel with the X axis guide member 31 and outside the X axis guide members 31 for Y direction.

A stator bed is interposed between each stator 321 and the base 1 so as to secure each stator 321 to the base 1. A plurality of rows of magnets are arranged in X direction in the stator 321. Plate-shaped moving elements 322,322 of the X axis linear motors 32,32 are disposed on the respective lateral faces outside for Y direction of the X axis slider 3 and in parallel with the X axis guide member 31,31 and secured thereto. Each of the moving elements 322 has a plurality of rows of coils arranged to be in opposed relation with the rows of magnets in each stator 321. Only the fore side one of a pair of X axis linear motors 32 is seen in FIG. 1 and the other X axis linear motor is not seen here.

A C axis table 33, on which a workpiece is mounted, is rotatably supported on the X axis slider 3 so as to be capable of rotational indexing. The C axis table 33 is supported rotatably such that it can be indexed rotationally about C axis parallel with perpendicular (vertical) Z axis. Pressurized air with adjusted pressure is supplied to the portion (not shown) which rotatably supports the C axis table, so that a aerostatic bearing is formed. The rotational indexing of the C axis table 33 is performed by a direct drive motor (not shown). The construction and function of aerostatic bearings and direct drive motors are well known to those skilled in the technology of machine tools and do not compose the essential part of this invention, hence further explanation of this is omitted here.

A pair of X axis linear motors 32,32 and a pair of X axis guide members 31,31 are disposed at positions symmetric about the center of mass of the X axis slider 3 respectively so that the X axis slider 3 can be driven in X direction with a minimum vibration and minimum errors in alignment. Further, the X axis linear motors 32,32 and the X axis guide members 31,31 drive the X axis slider 3 in X direction with no contact therebetween at all so that the X axis slider 3 can be driven smoothly with no backlash error.

Reading heads 341,341 of a pair of X axis linear encoders 34,34 are secured to fixing blocks 342,342 respectively so as to detect the position of the X axis slider 3 in X direction. The fixing blocks 342,342 are secured to the top face of the base 1 at positions outside the X axis linear motors 32,32 for Y direction. Scales 343,343 are affixed to the top face of the X axis slider 3 at outside positions thereof and in parallel with the X axis guide members 31,31 respectively. On each of the scales 343,343 are marked a plurality of lattice divisions at an even pitch along X axis.

Each of the reading heads 341,341 has a light emitting element illuminating the scale 343 and a photosensitive element detecting light reflected by the scale 343, thereby reading out lattice divisions of the scale 343 with no contact in response to the variation in strength of light reflected by the scale 343. Only the fore side one of a pair of X axis linear encoders 34,34 is shown in FIG. 1 and the other is not seen here.

A pair of Y axis guide members 41,41 are secured to the top face of the base 1 on both sides for X direction with the respective fixing beds therebetween. Moving beds 411,411 are laid movably on the respective Y axis guide members 41,41. Y axis sliders 4,4 are laid on and secured to the respective moving beds 411,411. The moving beds 411,411 movably guide the Y axis sliders 4,4 in horizontal Y direction perpendicular to X axis. As shown in FIG. 1, one end of a Y axis connecting plate 412 is secured to one of the moving beds 411 at the lateral face thereof with screws and the other end of the Y axis connecting plate 412 is secured to the other of the moving beds 411 at the lateral face thereof with screws in a same manner. Consequently, both moving beds 411,411 are connected together, so that both Y axis sliders 4,4 can move synchronously on the Y axis guide members 41,41 respectively. Each of the Y axis sliders 4,4 is configured so as to have a narrow width for X direction and to be lengthened for Y and Z directions respectively.

The Y axis guide members 41,41 with a rectangular cross section are formed of material of alumina ceramic. The Y axis guide members 41,41 are secured to the top face of the base 1 such that only parts of, that is only both ends of, the bottom face of each Y axis guide member 41 abut with the top face of the base 1, in order to form Y axis guide faces on the four lateral sides of each Y axis guide member 41. Pressurized air with adjusted pressure is supplied into the bearing clearance between the Y axis sliders 4,4 and the Y axis guide faces so as to compose aerostatic bearings. A pair of Y axis linear motors 42,42 for driving the Y axis sliders 4,4 in Y direction are provided at positions outside the Y axis guide members 41,41 for X direction.

The Y axis linear motors 42,42 have stators 421,421 respectively, which have channels with a U-shaped cross section formed in the upper portion. The stator 421,421 are secured to the subbases 11,11 in parallel with the Y axis guide member 41,41 and outside the Y axis guide member 41,41 for X direction respectively. The material, which forms the subbases 11,11 secured on the top face of the base 1, is granite. A plurality of rows of magnets are arranged in Y direction in the stators 421,421.

The upper portions of moving elements 422,422 are secured to the lateral faces of the Y axis sliders 4,4 outside for X direction at the center of mass thereof and in parallel with the Y axis guide members respectively. The lower portions of the moving elements 422,422 are inserted into the U-shaped channels of the stators 421,421 respectively. Each of the moving elements 422,422 has a plurality of rows of coils arranged in opposed relation with the rows of magnets in each stator 421. Only fore side one of the pair of linear motors 4,4 is seen in FIG. 1 and major part of the other is not seen here.

Because the Y axis linear motors 42,42 are disposed at the center of mass of the combination of both Y axis sliders 4,4 and the Y axis sliders 4,4 are driven synchronously, the Y axis sliders 4,4 can be driven in Y direction with vibration and errors in alignment minimized. Further, because the Y axis linear motors 42,42 and the Y axis guide members 41,41 drive the Y axis sliders 4,4 in Y direction with no contact, the Y axis sliders 4,4 can be driven smoothly with no backlash error.

Reading heads 441,441 of a pair of Y axis linear encoder 44,44 are secured to fixing blocks 442,442 respectively so as to detect the position of the Y axis sliders 4,4 in Y direction. The fixing block 442,442 are secured to the top face of the subbases 11,11 at positions outside of the Y axis linear motors 42,42 for X direction. Scales 443,443 are affixed to the outside faces of the Y axis sliders 4,4 for X direction in parallel with the Y axis guide members 41,41 respectively.

On each of the scales 443,443 are marked a plurality of lattice divisions at an even pitch along Y axis. Each of the reading heads 441,441 has a light emitting element illuminating the scale 443 and a photosensitive element detecting light reflected by the scale 443, thereby reading out lattice divisions of the scale 443 with no contact in response to the variation in strength of light reflected by the scale 443. Only the fore side one of the pair of Y axis linear encoders 44,44 is seen in FIG. 1 and the other is not seen here.

A pair of Z axis sliders 5,5 are placed movably in Z direction perpendicular to both X and Y directions on the respective Y axis sliders 4,4. A pair of Z axis guide members 51,51 are secured to each of the Y axis sliders 4,4. The Z axis guide members 51,51 are disposed at the positions symmetric about the center of mass of the Z axis sliders 5,5 respectively so as to guide the Z axis sliders 5,5 movably in Z direction.

Two pairs of Z axis guide members 51,51 are formed of alumina ceramic with a rectangular cross section. Only parts of both ends of the Z axis guide members 51,51 abut with the inner side faces of the Y axis sliders 4,4 for X direction so as to form Z axis guide faces on the four lateral sides of each Z axis guide member 51. Pressurized air with adjusted pressure is supplied into the bearing clearances between the Z axis sliders 5,5 and the Z axis guide faces so as to compose aerostatic bearings. A pair of Z axis linear motors 52,52 for driving the Z axis sliders 5,5 in Z direction are provided at the positions symmetric about the center of mass of the Z axis sliders 5,5 and outside the Z axis guide members 51,51 for Y direction.

The stators 521,521 of the Z axis linear motors 52,52 have channels with a U-shaped cross section. The stator 521,521 are secured to the inner side faces of the Y axis sliders 4,4 for X direction in parallel with the Z axis guide members 51,51 and outside the Z axis guide member 51,51 for Y direction. A plurality of rows of magnets are arranged in Z direction in the stators 521,521. Moving elements 522,522 are secured to the inner side faces of the Z axis sliders 5,5 outside for Y direction at positions symmetric about the center of mass of the Z axis sliders 5,5 and in parallel with the Z axis guide member 51,51 respectively.

One end of each of moving elements 522,522 has a plurality of rows of coils arranged in opposed relation with the rows of magnets in the corresponding stators 521,521 and the other end of each of moving elements 522,522 is inserted into the channel with a U-shaped cross section. Only for the Z axis linear motor 52 at the right side of the back side Z axis slider 5, both of its stator 521 and moving element 522 are seen in FIG. 1 and only stators 521 are seen for other Z axis linear motors 52 here.

Because the Z axis linear motors 52,52 and the Z axis guide members 51,51 are disposed at positions symmetric about the center of mass of the Z axis sliders 5,5 respectively, the Z axis sliders 5,5 can be driven in Z direction with vibration and errors in alignment minimized. Further, because the Z axis linear motors 52,52 and the z axis guide members 51,51 drive the Z axis sliders 5,5 in Z direction with no contact, the Z axis sliders 5,5 can be driven smoothly with no backlash error.

Reading heads 541,541 of the Z axis linear encoder 54,54 are secured to the inner side faces of the Z axis sliders 5,5 outside for Y direction on both sides respectively so as to detect the position of the Z axis sliders 5,5 in Z direction. Scales 543,543 are affixed to the inside faces of the Y axis sliders 4 for X direction in parallel with the Z axis guide members 51,51 respectively.

On each of the scales 543,543 are marked a plurality of lattice divisions at an even pitch along Z axis. Each of the reading heads 541,541 has a light emitting element illuminating the scale 543 and a photosensitive element detecting light reflected by the scale 543, thereby reading out lattice divisions of the scale 543 with no contact in response to the variation in strength of light reflected by the scale 543. Only the left side one of the Z axis linear encoders 54,54 for the back side Z axis slider 5 is seen in FIG. 1 and the other Z axis linear encoders are not seen here.

A spindle head supporting beam 6 is rotatably supported at its both ends for X direction by the respective Z axis sliders 5,5 so as to be able to index rotationally about A axis parallel with X axis. Pressurized air with adjusted pressure is supplied into the rotatably supporting portions of the Z axis sliders 5,5 for A axis so as to compose aerostatic bearings respectively. The Z axis sliders 5,5 are indexed rotationally for A axis by direct drive motors respectively.

A spindle head 61 is secured to the spindle head supporting beam 6 at its central position for X direction. The spindle head 61 has a rotatable spindle, which is driven to rotate by an actuator of an air turbine type. The workpiece mounted on the C axis table 33 is machined with the tool 63 secured on the forward end of the spindle of the spindle head 61. Counter weights 62,62 are secured to the spindle head supporting beam 6 at its both ends for X direction so as to compensate for the unbalance of mass of the spindle head supporting beam 6 and the spindle head about A axis. Only back side one of the counter weights 62,62 is seen in FIG. 1 and the other is not seen here.

Because the direct drive motors rotationally indexing for A axis are disposed at positions symmetric about the center of mass of the spindle head supporting beam 6 with the spindle head 61, the spindle head supporting beam 6 can be indexed rotationally about A axis with vibration and errors in alignment minimized. Further, because the rotatably supporting portions for A axis are formed with aerostatic bearings and the rotational indexing for A axis is performed by direct drive motors completely with no contact, smooth driving can be performed without backlash errors.

As mentioned above, the major portions extending in X and Y axes form structures completely symmetric about the machining point respectively in the ultra-precision machine tool in an embodiment of this invention. Further, the major portions are formed of inorganic materials such as granite, alumina ceramic or the like, so that the workpiece can be machined with nanometer level accuracy with errors due to thermal displacement minimized.

Moreover, driving of portions is carried out for the center of mass for all the five axes, that is, for X, Y, Z, A and C axes, so that vibration and errors in alignment are minimized. Further, because the overhang for the spindle head or the table is small in the ultra-precision machine tool in an embodiment of this invention, the length of the force loop between the tool and the workpiece is short and the influence of elastic deformation in each portion can be minimized.

Yet further, because the X axis linear motors, the Y axis linear motors, the Z axis linear motors and the direct drive motors acting as heat sources for indexing rotationally for A axis are disposed separately from the cutting area and in a even manner in the ultra-precision machine tool in an embodiment of this invention, thermal deformation is uniform and errors due to thermal displacement is minimized.

What is claimed is:

1. An ultra-precision machine tool, which is provided with:
a base (1),
an X axis slider (3) provided movably in X direction horizontally on said base,
a pair of X axis guide members (31,31) which are disposed at positions symmetric about the center of mass of said X axis slider so as to movably guide said X axis slider in X direction,
a pair of X axis linear motors (32,32) which are disposed at positions symmetric about the center of mass of said X axis slider so as to drive said X axis slider in X direction,
a table (33) which is rotatably supported on said X axis slider and on which is mounted a workpiece,
a pair of Y axis sliders (4,4) which are disposed on said base on both sides of said X axis slider for X direction respectively so that said X axis slider is interposed therebetween and are provided movably in horizontal Y direction perpendicular to X direction,
a pair of Y axis guide members (41,41) which are disposed on said base on both sides of said X axis slider for X direction respectively so as to movably guide said Y axis sliders in Y direction respectively,
a pair of Y axis linear motors (42,42) which are disposed on said base on both sides of said X axis slider for X direction and at positions symmetric about the center of mass of the combination of said Y axis sliders so as to drive said Y axis sliders in Y direction,
a pair of Z axis sliders (5,5) which are provided movably in Z direction perpendicular to X and Y directions on said pair of Y axis sliders respectively,
two pairs of Z axis guide members (51,51) of which each pair of Z axis guide members are disposed at positions symmetric about the center of mass of each of said Z axis sliders on each of said Y axis sliders so as to movably guide said pair of Z axis sliders in Z direction respectively,
two pairs of Z axis linear motors (52,52) of which each pair of Z axis linear motors are disposed at positions symmetric about the center of mass of each of said Z axis sliders on each of said Y axis sliders so as to drive said pair of Z axis sliders in Z direction,
a spindle head supporting beam (6) in which both ends for X direction are rotatably supported on said Z axis sliders respectively so as to be capable of indexing rotationally about A axis parallel with X axis and
a spindle head (61) which is secured to said spindle head supporting beam at the central position thereof and has a spindle for holding a tool.

2. An ultra-precision machine tool according to claim 1, wherein said table is a C axis table rotatably supported so as to be capable of indexing rotationally about C axis parallel with Z axis.

3. An ultra-precision machine tool according to claim 1 or 2, wherein said counter weights are secured to said spindle head supporting beam at respective ends thereof so as to compensate for the unbalance of mass of the spindle head supporting beam 6 and the spindle head about A axis.

4. An ultra-precision machine tool according to claim 1 or 2,
wherein said X axis guide members, said Y axis guide members, said Z axis guide members, the rotationally supporting portions of said C axis table and the rotationally supporting portions of said spindle head supporting beam are composed of aerostatic bearings respectively.

5. An ultra-precision machine tool according to claim 1 or 2,
wherein said C axis table and said spindle head supporting beam are rotationally indexed by direct drive motors respectively.

6. An ultra-precision machine tool according to claim 1 or 2 further comprising:
an upper frame supporting said base,
a lower frame supporting said upper frame and disposed on the floor and
passive pneumatic vibration isolators interposed between said upper and lower frames and decreasing the vibration transferred from the floor to the base.

7. An ultra-precision machine tool according to claim 1 or 2, wherein said base is formed of granite and the materials of said X axis guide members, said Y axis guide members and said Z axis guide members are alumina ceramic respectively.

\* \* \* \* \*